J. A. LOWE.
Machine for Cutting out Web-Gates of Cast-Lead Traps.
No. 161,248.
Patented March 23, 1875.
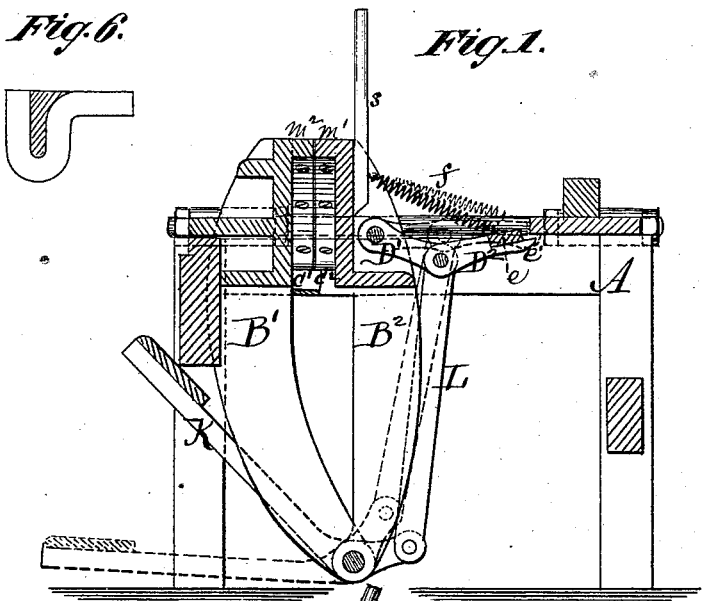
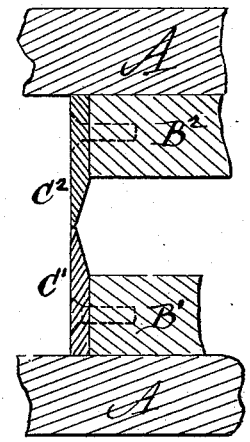
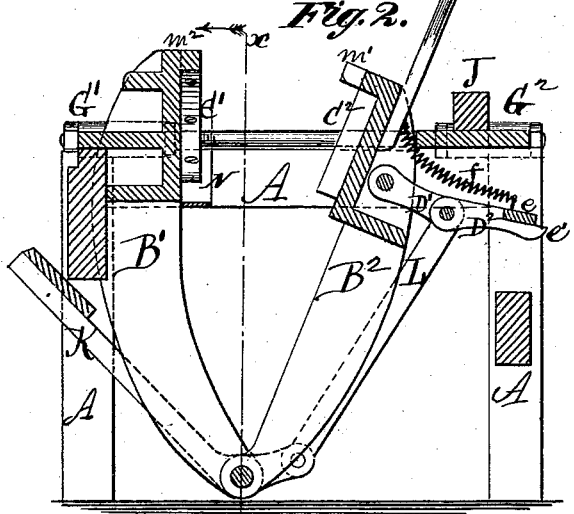
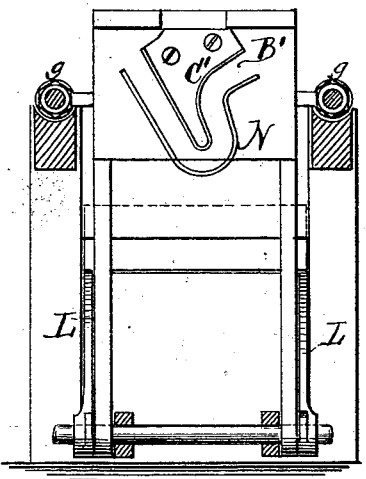
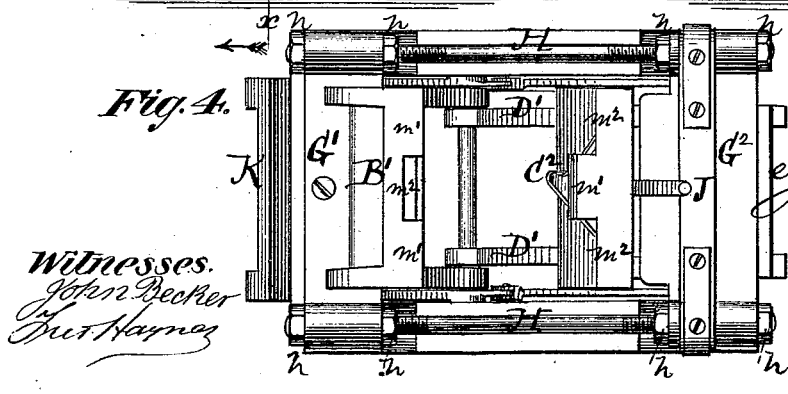

UNITED STATES PATENT OFFICE.

JAMES A. LOWE, OF NEW YORK, N. Y.

IMPROVEMENT IN MACHINES FOR CUTTING OUT WEB-GATES OF CAST LEAD TRAPS.

Specification forming part of Letters Patent No. 161,248, dated March 23, 1875; application filed September 15, 1874.

*To all whom it may concern:*

Be it known that I, JAMES A. LOWE, of New York, in the county and State of New York, have invented a Machine for Cutting Out Gates of Cast Lead Traps, of which the following is a specification:

Cast lead traps are usually formed with web-gates, in order to insure solidity, and also to facilitate the running of the metal, and prevent the cooling thereof in the mold. These gates have heretofore been sawed out by hand, which was a slow and tedious process.

My invention relates to a machine for cutting out the gates at one operation; and it consists in the combination of a stationary cutter, a movable cutter, a toggle-joint, and a treadle or lever, the whole constructed, combined, and operating in the manner and for the purpose hereinafter particularly described.

In the accompanying drawing, Figure 1 is a longitudinal vertical section of my improved machine with the cutters in contact with each other. Fig. 2 is a similar view, with the cutters separated. Fig. 3 is a transverse section taken in the line $x\ x$ of Fig. 2. Fig. 4 is a top view of the machine. Fig. 5 is a sectional view, showing the shape of the cutters. Fig. 6 represents a trap formed with a web-gate.

The frame-work A, which supports the working parts, may be of any suitable construction, consisting of upright posts connected by horizontal rails. At one end of the frame is a stationary bar or plate, $B^1$, on the inner side of the upper portion of which is a cutter, $C^1$, consisting of a blade bent in the form of the space between the two tubular portions of the trap shown in Fig. 6. This cutter is attached to the bar in any suitable manner, so that it may be removed and replaced by another of different size, when necessary. To the lower end of the bar $B^1$ is pivoted a similar plate or bar, $B^2$, on the inner side of which is a cutter, $C^2$, corresponding in form with the cutter $C^1$, and attached in a similar manner, and at a point immediately opposite. To the outer side of the bar $B^2$ is pivoted the inner ends of two toggle-bars, $D^1$, the other ends of which are pivoted to two bars, $D^2$, connected at their rear ends by a block, $e$, on the lower side of which are two lugs, $e'$, projecting toward the rear of the machine. The block $e$ is connected to the rear side of the plate or bar $B^2$ by a spiral spring, $f$, which has a tendency to keep the toggle-joint bent, and the block $e$ in a position somewhat higher than a horizontal line drawn through the pivot which connects the toggle-bars, as shown in Fig. 1. The rear or outer side of the block $e$, when the parts are in the positions shown in Fig. 1, is opposite to and on a line with a plate, $G^2$, which rests upon the top of the frame A, at the rear end, and is connected with a similar plate, $G^1$, at the front end, by screw-rods H passing through eyes $g$ in the plates, and provided with nuts $h$, by means of which the plate $G^2$ may be adjusted to the proper distance from the plate $G^1$ to give the required pressure to the cutters when the toggle-joint is straightened, as hereinafter described. The plate $G^1$ is rigidly attached to the frame A by bolts or screws, and the stationary plate or bar $B^1$, which carries the cutter $C^1$, is attached to said plate $G^1$, or, if desired, may be made in one piece therewith. The plate $G^2$ is held down to the frame A by a yoke, J, but is free to travel horizontally on the frame, when necessary, by properly adjusting the nuts $h$.

At the lower end of the stationary plate or bar $B^1$ is pivoted a treadle consisting of two levers, K, having the ends of their long arms connected by a foot-board.

If desired, the levers may be connected by a bar or handle, so as to be worked by hand instead of the feet.

To the short arms of the levers K are pivoted the lower ends of connecting-rods L, the upper ends of which are pivoted to the rod which connects the toggle-bars $D^1\ D^2$. The upper ends of the plates or bars $B^1\ B^2$ are provided with stops consisting of projections $m^1$ and depressions $m^2$, which match into each other when the bars are in the position shown in Fig. 1, and limit their motion toward each other. The cutters $C^1\ C^2$ have thin but square flat edges, as shown in Fig. 5, and the width of the blades, and their attachment to the plates or bars $B^1\ B^2$, is such that the edges just come in contact, without pressure, when the stops $m^1\ m^2$ come together. To the plate $B^1$ is attached a plate, N, curved to correspond with the outer curvature of the trap, and parallel with the curvature of the cutter $C^1$. This plate N serves as a rest and guide for the work while being operated upon by the cutters.

In operating this machine, the operator grasps the trap in his hands, and places it upon the rest or guide N, so that the cutter $C^1$ is in contact with the gate of the casting, close to the tubular portion of the trap. The movable plate or bar $B^2$ is then moved forward until the stops $m^1$ $m^2$ match into each other, and the cutter $C^2$ comes in contact with the gate opposite the cutter $C^1$. The treadle K is then depressed, raising the rods L, and straightening the toggle-joint $D^1$ $D^2$, causing it to press against the plate or bar $B^2$ and force the cutters through the gate. The cutters approach each other in a straight line, and do not pass like shears, but come together without overlapping, and separate the metal by biting it off close to the surface of the tubular portion. Each cutter supports the metal against the action of the other, and the travel of the movable cutter is limited by the stops $m^1$ $m^2$. When the gate is cut off from the trap, the treadle or lever is raised, the movable plate or bar $B^2$ is moved back, the trap removed, and the machine, in the position shown in Fig. 2, is ready for a repetition of the operation.

The treadle or lever K may be provided with a weight or spring to raise it after each cutting operation.

By arranging the cutter $C^2$ on a swinging bar, the cutting operation is commenced at the lower part of the gate, so that the resistance is lightest where the toggle action is weakest, and the power increases as the resistance becomes greater.

What I claim as new, and desire to secure by Letters Patent, is—

1. The combination of the cutters $C^1$ $C^2$, formed with square flat edges, arranged to come in contact without pressure or overlapping, substantially as and for the purpose shown and described.

2. The combination, with the cutters $C^1$ $C^2$, of the stationary plate or bar $B^1$, movable plate or bar $B^2$, and stops $m^1$ $m^2$, substantially as and for the purpose shown and described.

3. The combination of the plates or bars $B^1$ $B^2$, cutters $C^1$ $C^2$, toggle-joint $D^1$ $D^2$, plate or bearing $G^2$, treadle or lever K, and connecting-rods L, substantially as and for the purpose shown and described.

4. The rest or guide N, in combination with the cutter $C^1$, substantially as and for the purpose shown and described.

JAMES A. LOWE.

Witnesses:
FRED. HAYNES,
MICHAEL RYAN.